United States Patent

Meyer et al.

[11] Patent Number: 5,547,064
[45] Date of Patent: Aug. 20, 1996

[54] APPARATUS FOR SERIALLY TRANSFERRING OBJECTS BETWEEN TWO CONVEYOR MEANS

[75] Inventors: Meinrad Meyer, Wohlen; Peter Summermatter, Zürich, both of Switzerland

[73] Assignee: Elpatronic AG, Zug, Switzerland

[21] Appl. No.: 381,773

[22] Filed: Feb. 1, 1995

[30] Foreign Application Priority Data

| Feb. 8, 1994 | [CH] | Switzerland | 352/94 |
| Feb. 11, 1994 | [CH] | Switzerland | 412/94 |
| Feb. 16, 1994 | [CH] | Switzerland | 469/94 |

[51] Int. Cl.$^6$ ................................................ B65G 37/00
[52] U.S. Cl. ..................... 198/468.1; 198/430; 198/740; 198/462.1
[58] Field of Search .......................... 198/430, 468.1, 198/740, 461.1, 462.1

[56] References Cited

U.S. PATENT DOCUMENTS

| 4,081,073 | 3/1978 | Zappia | 198/740 |
| 4,219,112 | 8/1980 | Loewenthal | 198/740 |

FOREIGN PATENT DOCUMENTS

| 0273135 | 7/1988 | European Pat. Off. | B23K 37/04 |
| 0290765 | 11/1988 | European Pat. Off. | B23K 11/36 |
| 2141987 | 1/1985 | United Kingdom | B65G 47/30 |

OTHER PUBLICATIONS

Dr.-Ing E. H. Kurt Hain"Getriebebeispiel–Atlas" 1973, VDI–Verlag Gmbh, Düsseldorf Sechsgliedriges Kurbelgetriebe mit Parallel–Koppelbewegung für Lochstreifenvorschub/10.1.4.

*Primary Examiner*—Joseph E. Valenza
*Attorney, Agent, or Firm*—McCormick, Paulding & Huber

[57] ABSTRACT

The invention relates to an apparatus for serially transferring objects between a supply conveyor and a receiving conveyor, in which the speed of the supply conveyor is not smaller than the speed of the receiving conveyor. The apparatus includes a feed cam which is inserted into the stream of supplied objects, an object being overtaken by pushing from behind in order to transfer it to the receiving conveyor means, whereby the feed cam must return for the transfer of each object outside of the serial stream of objects to its insertion location. The apparatus according to the invention comprises a four bar linkage with a drive crank (a), a coupling (b), a driven crank (c), and a stationary link (d) in which the feed cam is connected to the coupling (c) at a coupling point (C). The four bar linkage is designed such that it is an mechanism which additionally obeys certain conditions.

12 Claims, 2 Drawing Sheets

APPARATUS FOR SERIALLY TRANSFERRING OBJECTS BETWEEN TWO CONVEYOR MEANS

BACKGROUND OF THE INVENTION

The invention relates to an apparatus according to the patent claims for serially transferring objects between two conveying means. In particular, the invention relates to an apparatus for the type of transfer in which the speed of the supplying conveyor means is larger than or the same as the speed of the receiving conveyor means such that the spacing between the supplied objects is larger than or the same as the spacing between the transferred objects.

Apparatuses of this type are employed for example in the manufacture of can bodies. The rounded bodies prior to welding are ejected from a shaping apparatus and are supplied at a supply speed for transfer. Then they are transferred to a welding station, and advanced through the welding station at a constant welding speed where they are simultaneously welded along axially extending edges. During welding, the bodies are advanced with a very small spacing such that the welding speed is generally smaller than or at most the same as the supply speed. The transfer generally occurs with the aid of a feed cam which engages a body from behind, advances the body over a support surface extending along a transfer strip and there slows down the body whereby the body is overtaken by the conveyor means at the welding station, and the feed cam at its exit point returns to pickup the next body.

Generally the feed cam performs the following movements in each operation:

moving out of an exit position in the space between the last-supplied object and the following object (can bodies), from the side lying opposite the support surface the cam drops into the serially supplied stream of objects, advantageously with a speed parallel to the general conveying direction which is greater than the supply speed;

it picks up the referenced objects still being advanced by the supplying conveying means where it accelerates if necessary;

it overtakes the object from the supplying conveying means where it contacts the object from behind; it advances the overtaken object over a straight transfer strip where it slows down to a transfer speed (welding speed), if necessary after an initial acceleration;

it falls behind the object through further slowdowns where upon reaching the transfer speed the object is overtaken over by transfer conveying means;

it pulls out of the serial stream of objects to the side opposite from the support surface;

it returns outside the serial stream to its starting position.

Since the supply speed is larger than (or at most same as) the transfer speed, upon delivery the spacing between the series of advancing objects, as already mentioned, when supplied is larger than that when overtaken by the transfer conveying means (operating time must be the same). This means that the feed cam must drop out from the series stream faster, that is, with a smaller radius of curvature, than it rises into the stream.

To realize the described operational motions of a feed cam of this type in the prior art, cam drives, cranks with lifting cams or coupling transmissions having a plurality of driven axes were employed, for example. All of these apparatuses are expensive to manufacture and also to operate at high operating speeds.

It is also known that in order to realize a cyclic movement of a feed cam as has been described above, a simple four bar linkage can be employed. However, it is a commonly held opinion that four bar linkages of this type are not suitable for high speeds and for high endurance because of the unavoidable high peak forces. It is a further held opinion that the realization of a special transmission of this type would be very expensive because for its layout a high design and/or experimental expense would be necessary since changes in the transmission parameters and the effect of these changes have no standard simple recognized relationship. For these reasons this type of four bar linkage is generally put aside even though it is likewise known that its manufacture means lower costs than the manufacture of for example a cam drive. A further reason for the limited extension of the four bar linkage to applications such as described above, could be that after its manufacture the four bar linkage is essentially not changeable to achieve its goals.

SUMMARY OF THE INVENTION

It is therefore an object of the present invention to provide an apparatus for the serial transfer of objects between two conveying means with a drive mechanism and a feed cam driven by the mechanism which is a four bar linkage. The apparatus should be at least drivable at speeds as high as the corresponding apparatus with a cam drive and should be able to be accomplished simply and inexpensively with high level of durability.

This object is achieved by means of an apparatus with a feed cam driven by a four bar linkage having a drive crank a, a coupling b, a driven crank c and a substionary link d which are linked with one another such that the feed cam contacts the objects to be transferred one behind the other in a substantially straight linear movement over a transfer strip and returns again outside of the serial stream of objects on a return path again into its departure position. The four bar linkage is a oscillating crank mechanism for which the link lengths satisfy the following relationships: $a<c<b<d$ or $a<b<c<d$ and $(a+d)<(b+c)$. The feed cam is connected fixedly to the coupling in the region of a coupling point.

BRIEF DESCRIPTION OF THE DRAWINGS

The apparatus according to the invention and its functions are now further described with the aid of the following drawings in which.

DESCRIPTION OF THE PREFERRED EMBODIMENTS

Figure 1:
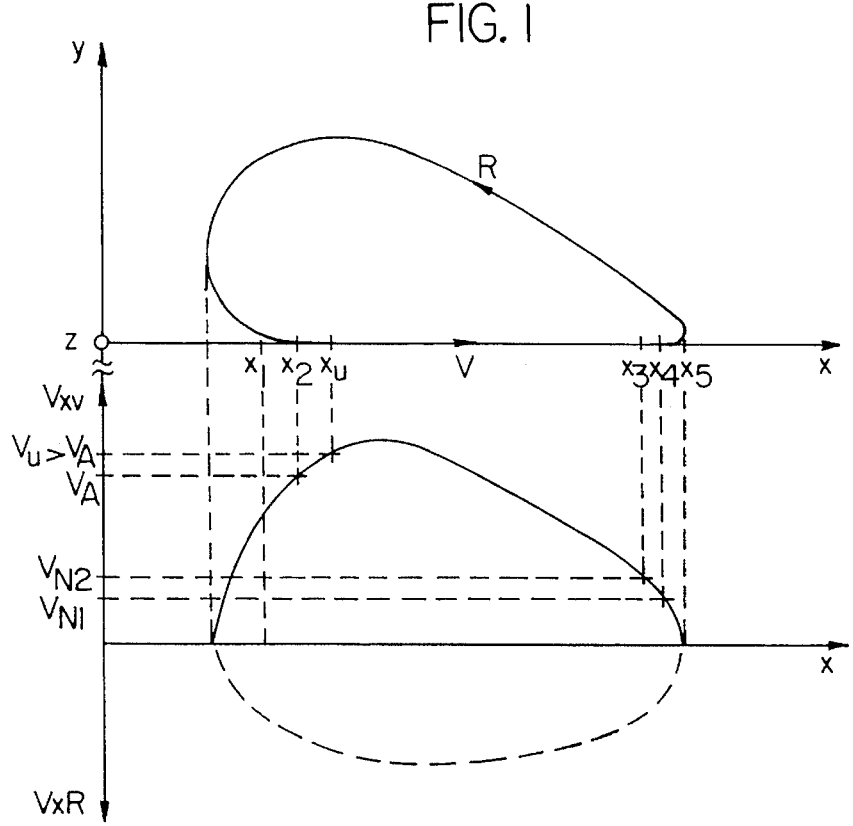
FIG. 1 is the cyclic movement achieved by the feed cam as already described above.

FIG. 1 schematically shows in a coordinate system (x,y,z) selected at will the cyclic movement accomplished by the feed cam for serial transfer and the speed profile yielded during the cyclic movement. The transfer strip V over which the feed cam advances the objects is arranged along the x-axis and the feed direction is in the positive x-axis direction. The return movement R (as well as the forward movement along the transfer strip V) extends in the xy-plane. The z-axis is perpendicular to the xy-plane. In the upper portion of FIG. 1 the cyclic displacement of the feed cam is illustrated in the xy-plane, and in the lower part, the speed profile that must be generated for the serial transfer, that is, the speed components of the feed cam in the x-direction as a function of the position of the feed cam ($v_{xv}$ and $v_{xr}$ as function of x).

As already described above, the cyclic movement is comprised of a substantially straight transfer strip V and a return path R in which the return path at the entrance side (left in the illustration) can blend more gradually into the transfer strip than at the output side (to the right in the illustration) since at the input side the spacing between the products is larger than at the output side.

$x_1$ illustrates the point along the displacement curve at which the feed cam drops into the serial stream. $x_2$ illustrates any point at which the cam reaches the supply speed. The effective interception point $x_u$ must lie to the right of both points $x_1$ and $x_2$ (cam entry and vu>va). Depending upon the speed $v_{N1}$, $v_{N2}$ of the overtaking conveyor means the objects will be transferred for example at a point $x_3$ or $x_4$. The cam then withdraws very sharply out of the serial stream ($x_5$).

The path of the cam on its return (R) to an entry position is of secondary interest as well as the speed profile over this return path (dotted $v_{xR}$ as a function of x).

The apparatus according to the invention should be usable for cyclic movements as described above with an useful stroke ($x_1$ to $x_4$) of approximately 40 to 200 mm, in which the useful stroke should amount to at least 50% of the total stroke (the entire extent of the movement path in the x-direction). Furthermore, the apparatus according to the present invention should be able to maintain between 600 to 1200 cycles per minute (depending upon stroke).

Figure 2:
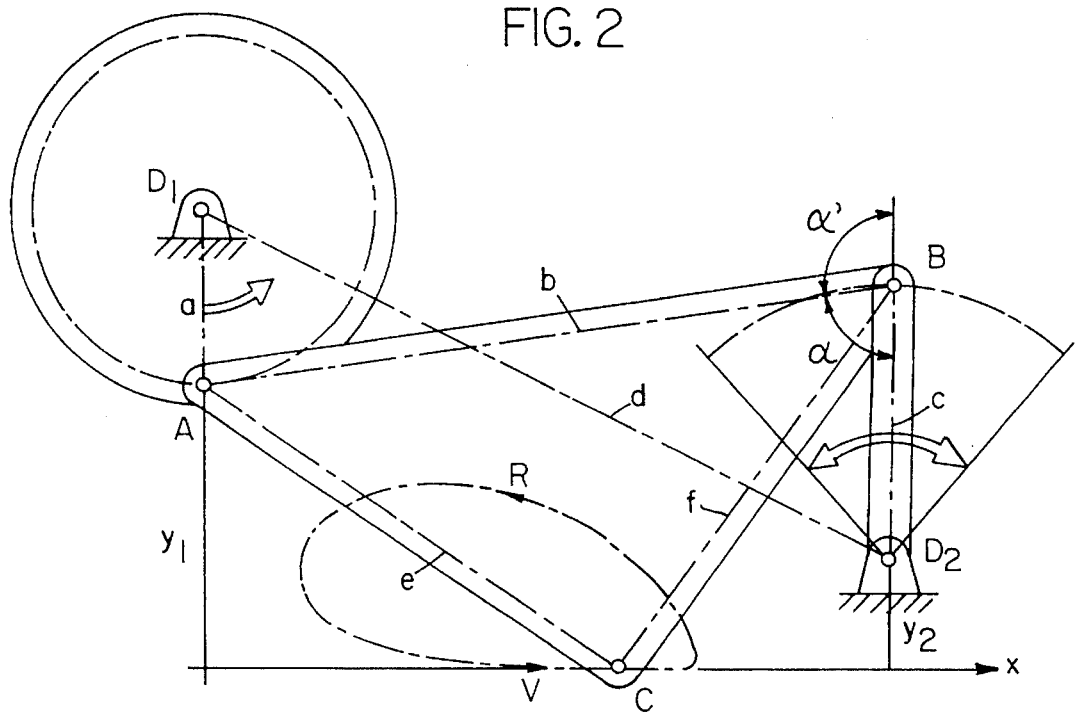
FIG. 2 is a schematic of an exemplary embodiment of the four bar linkage for the apparatus according to the present invention.

FIG. 2 shows a schematic of an exemplary embodiment of the four bar linkage that is employed in the apparatus according to the present invention. It relates to a four bar linkage functioning as an oscillating crank mechanism. It is comprised of a crank a rotatably driven by means of a drive mechanism about a stationary axis $D_1$ a crank c rotatable about a similar stationary axis $D_2$ and a coupling b connected with the drive crank and the driven crank for rotation about the axes A and B, the feed cam being connected to the coupling in the region of coupling point C (the point at which the transfer movement is accomplished). The position of the coupling point C relative to the coupling b is defined by means of the distance between C and A or correspondingly B (the distances e and f). The region between $D_1$ and $D_2$ illustrates the stationary link d of the four bar linkage. FIG. 2 likewise illustrates the movement paths V/R of the coupling point C and consists of the essentially straight transfer strip V which lies on the x-axis and the return path R.

All three links of the four bar linkage (the drive crank, the driven crank and the coupling) move in planes which are parallel to the xy-plane, and all rotation axes $D_1$, $D_2$, A, B are oriented essentially parallel to the z-axis.

The four bar linkage is an oscillating crank mechanism in which the drive crank a moves in a full revolution while the driven crank c only moves back and forth within a limited sector.

In the following, the references a, b, c and d are used for the links themselves as well as for the lengths of the links.

For the oscillating crank mechanism the following relationships are generally valid:

a<c<b<d or a<b<c<d and (a+d)<(b+c)

or a<d<c<b or a<c<d<b and (a+b)<(c+d)

For the oscillating crank mechanisms which are employed as a solution to the stated object, the only oscillating crank mechanisms applicable are those which satisfy one of the two relationships in the upper line in which the stationary link d is therefore the longest.

In addition to these general relationships for the oscillating crank mechanism an embodiment according to FIG. 2 must fulfill the following relationships:

The stationary pivot axis $D_1$ of the drive crank a lies on the same side of the x-axis as the return path R of the movement path of the coupling point C and also at the entry side of the transfer strip V.

The free pivot axis A of the drive crank a is disposed to one side of the x-axis when the coupling point C is positioned on the transfer strip V.

The stationary pivot axis $D_2$ of the driven crank c can lie on both sides of the x-axis whereby its distance Y2 from the x-axis is smaller than the distance Y1 between $D_1$ and the x-axis. With this, $D_2$ lies opposite from $D_1$ (in the x-direction) or toward the output side of the transfer strip V.

The y-coordinate of the free pivot point B of the driven crank c is always larger than the y-coordinate of its stationary pivot point $D_2$.

The length of the driven crank c is at most twice as long as the length of the drive crank a ($a<c<2a$).

The length of the coupling b and the distances e and f between the coupling point C and the pivot axes A and B differ by not more than a factor of 2 from one another.

The distance Y1 between $D_1$ and the x-axis is smaller than the length of the coupling b and smaller than the distances e and f between the coupling point C and the pivot points A and B (Y1<b, e, f).

The apex angle α or α' between the driven crank c and the coupling b is larger than 30° for each position of the four bar linkage. This condition must only be fulfilled for the required high resolutions of 600 to 1200 per minute with a required length of the useful displacements of 200 mm to 40 mm.

From a mathematical perspective the four bar linkage is definite (number of degrees of freedom equals zero), if it consists for example of two bearings with one rotational degree of freedom parallel to the x,y-plane, one bearing with three rotational degrees (swivel linkage) and one bearing with a rotational degree freedom parallel to the x,y-plane and a translational degree of freedom parallel to the z-axis (cylindrical linkage). It appears however that a mechanically definite drive of this type is effectively indefinite apparently on account of the unavoidably minimal amount of free-play and elasticity of the various linkages.

For these reasons and to make possible higher speeds and greater durability, the apparatus according to the present invention can employ a mathematically redundant four bar linkage about two degrees of freedom with the following bearing arrangements:

three bearings with a rotational degree of freedom parallel to the x,y-plane which are advantageously stressed and;

one bearing with a rotational degree of freedom parallel to the x,y-plane and a translational degree of freedom parallel to the x-axis.

Preferably the bearing with two degrees of freedom is the stationary bearing of the driven crank.

For the four bar linkage of the apparatus according to the present invention commonly available bearings are employed in practice. These bearings are appropriate and can be easily substituted.

The driven crank a is operatively connected for producing its rotation with a drive which is not illustrated in FIG. 2. For this, a drive having a constant angular speed can be employed. Should it be necessary for the movement of the feed cam to vary the required speed profile in contrast to the speed profile produced by means of the four bar linkage having a constant angular speed crank apparatus, a further drive can be inserted in between the drive and the four bar linkage, or a drive with an electronically controlled and cyclically variable angular speed can be employed.

Figure 3:
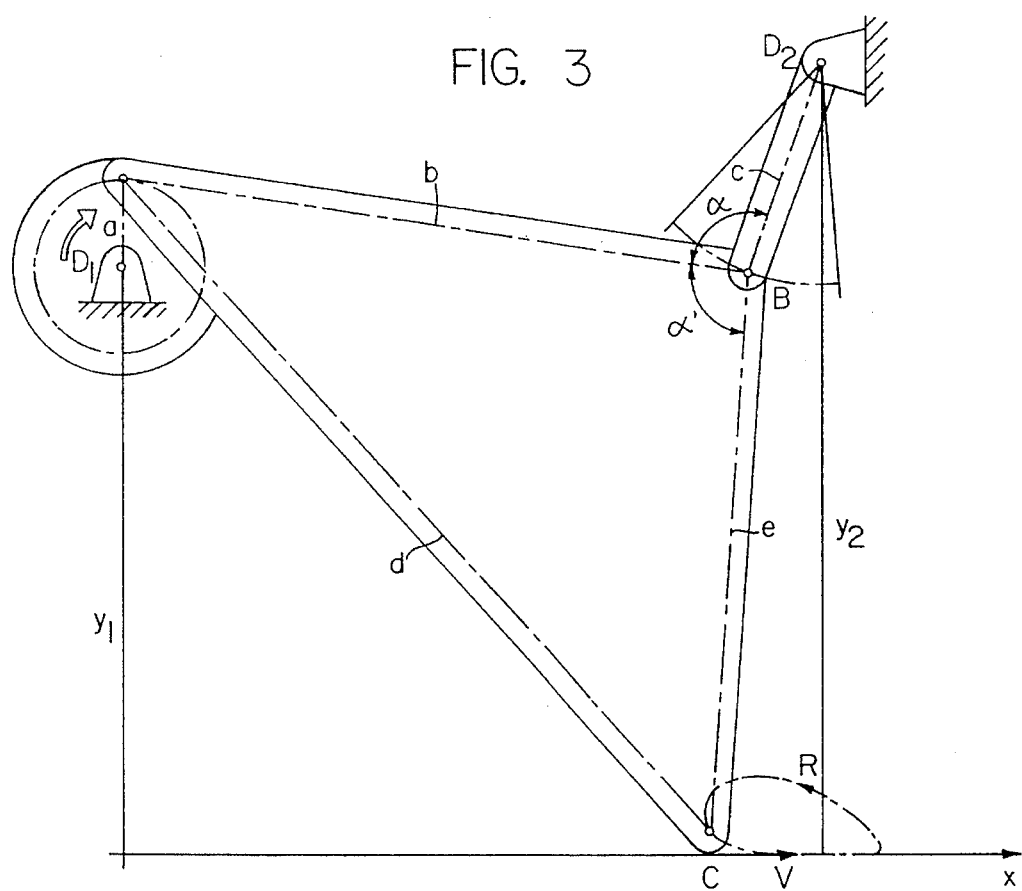
FIG. 3 is a schematic of a further exemplary embodiment of the four bar linkage for the apparatus of the present invention.

FIG. 3 shows further four bar linkage that is available for the apparatus according to the present invention. The same reference numerals are employed as in FIG. 2. for the individual parts of the linkage. It concerns a oscillating crank mechanism which fulfills one of the two general conditions for oscillating crank mechanisms mentioned already in connection with the linkage of FIG. 2, namely: a<c<b<d or a<b<c<d and (a+d) <(b+c). Besides the oscillating crank mechanism must fulfill the following additional conditions:

The stationary pivot axis $D_1$ of the drive crank a lies on the same side of the x-axis as the return path R of path of movement of the coupling point C and also on the entry side of the transfer strip V.

The free pivot point A of the drive crank a is located away from the x-axis when the coupling point C is positioned on the transfer strip V, The stationary pivot axis $D_2$ of the driven crank c lies on the same side of the x-axis as the return path R of the path of movement of the coupling point C whereby the distance Y2 of the stationary pivot axis $D_2$ of the driven crank from the x-axis is larger than the distance Y1 between $D_1$ and the x-axis. Accordingly $D_2$ lies opposite $D_1$ (x-direction) more toward the output side of the transfer strip V.

The y-coordinate of the free pivot axis B of the driven crank c is always smaller than the y-coordinate of its stationary pivot point $D_2$.

The length of the driven crank c is at most three times as large as the length of the drive crank a (a<c<3a).

The length of the coupling b and the distances e and f between coupling point C and the pivot axes A and B do not differ from one another by more than a factor of 2.

The distance Y1 between $D_1$ and the x-axis is smaller than the length of the coupling b and smaller than the distances e and f between the coupling point C and pivot axes A and B (Y1 <b, e, f).

The apex angle α or α' between the driven crank c and the coupling b is less than 30° for each position of the four bar linkage. This condition must be fulfilled only for the required high cyclic speed of 600 to 1200 cycles per minute with the required lengths of usable displacement of 200 mm to 40 mm.

As has already been mentioned the coupling points of a four bar linkage that fulfills the conditions laid out in conjunction with FIGS. 2 or 3 yield a motion curve which is suitable for solving the stated object. For specific predetermined movement curves the specifically applicable four bar linkage must be sought within the defined conditions.

In the following a specific four bar linkage is described as an example. This four bar linkage fulfills the same conditions which are described in conjunction with FIG. 2 and can be employed for the transfer of can bodies from one supplying conveyor means on which the cans are supplied with a spacing of at least 43 mm from one another to a welding station through which the bodies are advanced with a spacing of 1 mm. The useful displacement should amount to approximately 60 mm (depending upon the tolerance with regard to the linearity at the entry side and the transfer speed at the output side). The measurements and the positioning of the specific four bar linkage are in a coordinate system in which the linear portion of the movement track (usable displacement) lies on the x-axis and the stationary pivot axis $D_1$ intersects the y-axis (the x-coordinate of $D_1$=zero), and in millimeters are as follows (reference numerals in the coordinate system shown in FIGS. 2 or 3): $D_1$: 0.00/132.00; $D_2$: 201.00/31.00; a: 51.00; b: 205.00; c: 78.75; e: 145.00; f: 138.00; the usable displacement of this four bar linkage extends approximately from $x_1$=80 to $x_4$=140.

For transferring bodies to a welding station the transfer point depends upon the body height (extending in the x-direction). In order to be able to transfer bodies having various heights through a stationary welding station, the movement track of the feed cam must be shiftable in the x-direction. A similar shiftability is also necessary if for example the point on the x-axis ($x_3$ or $x_4$ in FIG. 1), at which the object to be transferred reaches the speed of the receiving conveyor means and on account of this the object is simply overtaken from the receiving conveyor means, should be positioned at the same location on the x-axis for various applications with various overtaking speeds. In order to achieve an adjustability of this type the two stationary pivot axis $D_1$ and $D_2$ are located on a frame that is shiftable parallel to the x-axis.

Figure 4:
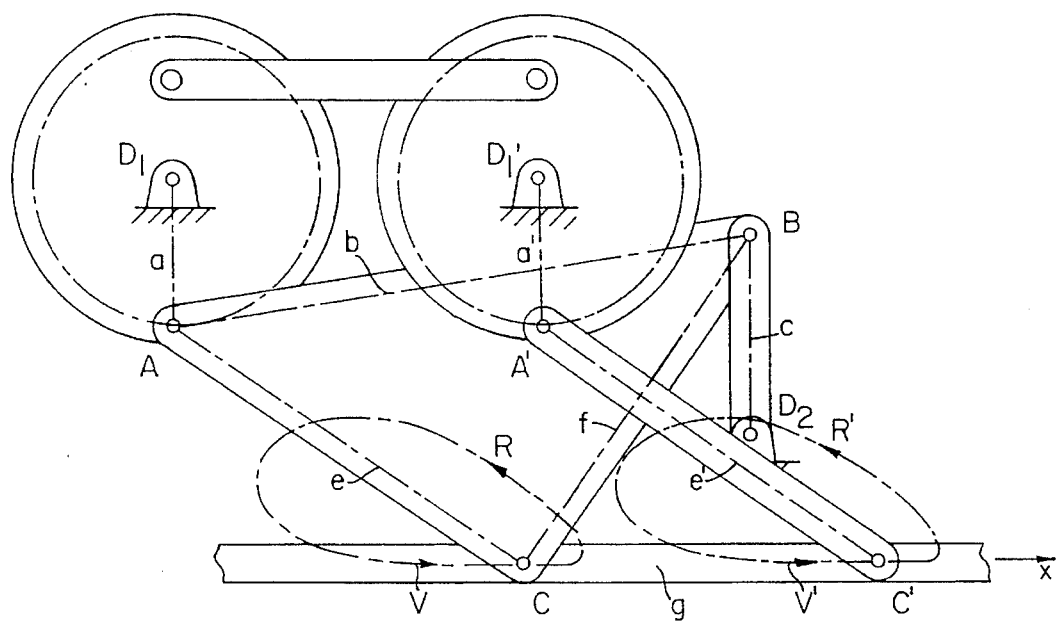
FIG. 4 is a schematic of a parallel crank drive for producing a displacement in the x-direction from the movement of the feed cam.

FIG. 4 illustrates still a further possibility for shifting of the motion curve of the feed cam or correspondingly the coupling point C parallel to the x-axis. It concerns a parallel crank drive which forms one of the above described four bar linkages.

A further crank drive is arranged parallel to a four bar linkage $D_1$/A/B/$D_2$, as described in connection with FIGS. 2 and 3, and consists of a second drive crank a' driven synchronously and parallel to the drive crank a and a reduced coupling e' (same length as e) with an additional coupling point c' pivotally mounted thereon (pivot axis A'). At the two coupling points C and C' an additional link g is pivotally connected to the two couplings b and e' whose length is selected such that e and e' are parallel to one another. This link g in each position of the two parallel drives is oriented parallel to the transfer strip V (x-axis). Now the feed cam is arranged adjustably on the link g or an extension thereof above the coupling points C and C' and its movement curve in the illustrated drawings (V/R and V'/R') is shiftable parallel to the x-axis without having to shift the stationary axis of the drive.

We claim:

1. Apparatus for serially transferring objects from a supply conveyor means to a receiving conveyor means in which the speed of the supply conveyor means is larger than or equal to the speed of the receiving conveyor means which apparatus comprises a feed cam which is of a type drivable by means of a four bar linkage with a drive crank (a), a coupling (b), a driven crank (c) and a stationary link (d)

which are linked with one another such that the feed cam contacts the objects to be transferred one behind the other in a substantially straight linear movement over a transfer strip (V) and returns again outside of the serial stream of objects on a return path (R) again into its departure position characterized in that the four bar linkage is a oscillating crank mechanism for which the link lengths satisfy the following: a<c<b<d or a<b<c<d and (a+d)<(b+c), and that the feed cam is connected fixedly to the coupling (c) in the region of a coupling point (C).

2. Apparatus according to claim 1 characterized in that for the oscillating crank mechanism the following conditions are additionally valid:

the stationary pivot axis ($D_1$) of the drive crank (a) lies on the same side of the extension of the transfer strip (V) as the return path (R) of the coupling point (C) and additionally on the entry side of the transfer strip (V);

the free pivot point (A) between the drive crank (a) and the coupling (b) is positioned adjacent the extension of the transfer strip (V) when the coupling point (C) is positioned on the transfer strip (V);

the stationary pivot point ($D_2$) of the driven crank (c) can lie on both sides of the extension of the transfer strip (V) whereby its distance (Y2) from the extension of the transfer strip (V) is smaller than the distance (Y1) between the stationary pivot axis ($D_1$) of the drive crank (a) and this extension, and whereby the stationary pivot point ($D_2$) opposite the pivot point ($D_1$) in the direction of the transfer strip (V) lies more toward the output side of the strip;

the distance between the extension of the transfer strip (V) and the pivot point (B) of the driven crank (c) is larger than the distance between the extension of the transfer strip (V) and the stationary pivot point ($D_2$) of the driven crank (c) for each position of the oscillating crank mechanism;

the driven crank (c) is at most twice as long as the drive crank (a);

length of the coupling (b) and distances (e) and (f) between the coupling point (C) and the pivot points (A) and (B) differ from one another by at most a factor of 2;

distance (Y1) between the stationary pivot point ($D_1$) of the drive crank (a) and the extension of the transfer strip (V) is smaller than the length of the coupling (b) and smaller than the distances (e) and (f) between coupling point (C) and the free pivot points (A and B).

3. Apparatus according to claim 1 characterized in that the following conditions are additionally valid for the oscillating crank mechanism:

the stationary pivot point ($D_1$) of the drive crank (a) lies on the same side of the extension of the transfer strip (V) as the return path (R) of the coupling point (C) and additionally on the entry side of the transfer region (V);

the free pivot point (A) between the drive crank (a) and the coupling (b) is located away from the extension of the transfer strip (V) when the coupling point (C) is positioned on the transfer strip (V);

the stationary pivot point ($D_2$) of the driven crank (c) lies on the same side of the extension of the transfer strip (V) as the return path (R) of the coupling point (C) whereby its distance (Y2) from the extension of the transfer strip (V) is larger than the distance (Y1) between the stationary pivot point ($D_1$) of the drive crank (a) and this extension and whereby the stationary pivot point ($D_2$) opposite the pivot point ($D_1$) in the direction of the transfer strip (V) lies more toward its entry side;

the distance between the extension of the transfer strip (v) and the pivot point (B) of the driven crank (c) is smaller than the distance between the extension of the transfer strip (V) and the stationary pivot point ($D_2$) of the driven crank (c) for each position of the oscillating crank mechanism;

the driven crank (c) is at most three times as long as the drive crank (a);

the length of the coupling (b) and the distances (e) and (f) between the coupling point (C) and the pivot axes (A) and (B) differ from one another at most by a factor of 2;

the distance (Y1) between the stationary pivot point ($D_1$) of the drive crank (a) and the extension of the transfer strip (V) is smaller than the length of the coupling (b) and smaller than the distances (e) and (f) between the coupling point (C) and the free pivot axes (A) and (B).

4. Apparatus according to one of claim 1, characterized in that the apex angle ($\alpha$ or $\alpha'$) between the driven crank (c) and the coupling (b) is smaller than 30° in no position of the oscillating crank mechanism.

5. Apparatus according to one of claim 1, characterized in that the four bar linkage consists of three bearings, each having one rotatable degree of freedom and a bearing with one rotatable degree of freedom and one translational degree of freedom.

6. Apparatus according to claim 5, characterized in that the bearings with one degree of freedom are stressed.

7. Apparatus according to claim 5, characterized in that the bearing with one rotatable and one translational degree of freedom is the stationary bearing of the driven crank (c).

8. Apparatus according to claim 1, characterized in that the stationary pivot point of the drive crank (a) and the stationary pivot point of the driven crank (c) are mounted on a frame shiftable parallel to the transfer strip.

9. Apparatus according to claim 1, characterized in that a further linkage drive with a further drive crank (a') and a reduced coupling (e') with a coupling point (C) corresponding to the additional coupling point (C') is provided for the four bar linkage and parallel thereto, whereby a further link (g) is pivotally connected to the two coupling points (C and C') and the feed cam is slidably arranged on this link.

10. Apparatus according to one of claim 1, characterized in that the drive crank or cranks are operatively connected with a drive or a variable drive which drive is designed to produce a constant angular speed or a cyclically variable speed.

11. Apparatus according to claim 1 for transferring can bodies between a rounding station and a welding station.

12. Apparatus according to claim 2 for transferring can bodies between a rounding station and a welding station, characterized in that the apparatus includes an oscillating crank mechanism with a usable displacement of approximately 60 mm for the transfer of can bodies from a supply conveyor on which the bodies are supplied with a spacing of at least 43 mm for a welding station through which the bodies are advanced with a spacing of 1 mm, which oscillating crank mechanism has the following measurements and positions in millimeters in a coordinate system, in which the usable displacement extends along the x-axis and the x-coordinate of the stationary pivot axis ($D_1$) of the drive crank is zero: the stationary pivot axis of the drive crank ($D_1$): 0.00/132.00; the stationary pivot axis of the driven crank ($D_2$): 201.00/31.00; the length of the drive crank (a):

51.00; the length of the coupling (b): 250.00; the length of the driven crank (c): 78.75; the distance between the coupling point and the movable axis of the drive crank (e): 145.00; the distance between the coupling point and the moveable pivot axis of the driven crank (f): 138.00; the location of the usable displacement on the x-axis: from ($x_1$) approximately 80 to ($x_4$) approximately 140.

* * * * *